Sept. 9, 1969 H. P. SCHLAEPPI 3,466,613

INSTRUCTION BUFFERING SYSTEM

Filed Jan. 13, 1967 10 Sheets-Sheet 1

INVENTOR
HANS P. SCHLAEPPI

BY

ATTORNEY

Sept. 9, 1969 H. P. SCHLAEPPI 3,466,613

INSTRUCTION BUFFERING SYSTEM

Filed Jan. 13, 1967 10 Sheets-Sheet 5

United States Patent Office 3,466,613
Patented Sept. 9, 1969

3,466,613
INSTRUCTION BUFFERING SYSTEM
Hans P. Schlaeppi, Chappaqua, N.Y., assignor to International Business Machines Corporation, Armonk, N.Y., a corporation of New York
Filed Jan. 13, 1967, Ser. No. 609,160
Int. Cl. G11b *13/00;* G06f *1/00*
U.S. Cl. 340—172.5 16 Claims

ABSTRACT OF THE DISCLOSURE

An Instruction Buffering System including high speed local storage capacity for storing program segments. Program loops may be designated, which the machine transfers into high speed local storage, to obviate repeated main memory access cycles. Means are provided for storing loops larger than the local storage in said local storage whereby only memory access is required for the overflow portion. A determination is made during instruction fetching cycles whether a particular instruction has been or is to be stored in local storage. Main memory and the local storage are accessed accordingly and new instructions placed in local storage as required.

Background of invention

Every computer system large or small must have the ability to execute programs consisting of instructions. Generally, the instructions of a program are stored in memory in sequential order. In executing a program they are retrieved under control of the instruction counter. As is well known, after setting the instruction counter to the address of the first ins ruction of a sequence, successive instructions of that sequence will be retrieved from the successive storage locations where they reside. When the computer is ready to perform an instruction the instruction counter dispatches the address of this instruction to Main Memory which is then accessed, and the instruction so retrieved is sent from Main Memory to the Instruction Register, whereafter it is decoded. Conventionally, the instruction will contain information specifying both the operation to be performed and the address of a data word which is to be submitted to this operation. Since the data word is also stored in Main Memory it must be retrieved therefrom before the required operations can be performed. Thus, in order to execute an instruction two separate memory access cycles are ordinarily required, one to obtain the instruction itself and the other to obtain the data word affected. As may be readily appreciated, any way of avoiding these Main Memory access cycles will appreciably save machine operating time on a given set of instructions.

In more complex programs, certain instruction sequences are repeated a number of times and are normally referred to as loops. At the end of a loop an instruction to make a test is normally given and depending upon the results of this test the machine will either go back to the instruction at the beginning of the loop or continue by executing the instruction sequence following the loop.

Where a given program does not contain any loops, very little can be done to avoid a separate Main Memory access cycle each time a new instruction is fetched. However, in the case of loops where certain instruction sequences are to be performed several or perhaps hundreds of times, it is obviously beneficial to provide some means of holding instruction sequences or at least parts thereof in local storage, which can be accessed independently of and affected more rapidly than Main Storage.

One type of prior art instruction buffering scheme involves the use of a multi-word or multi-instruction shift register such that each time a group of new instructions which might for instance comprise a single instruction is accessed it is entered into the top of the shift register and an old group of instructions passes out the bottom and is lost to the buffer. Thus, depending upon the size of this shift register, when the program loops back to a point in the string of instructions where it has passed earlier, two cases are possible. If the shift register is long enough, the beginning of the loop will still be in this register. However, if the register is not sufficiently large and the beginning of the loop has been lost, the entire loop of instructions will have to be fetched from Main Memory, again.

An alternative system used by the University of Illinois in its ILLIAC II computer used a bufler store having a fixed number of storage locations. In this configuration, if the loop to be stored is smaller than the buffer, the unused storage location is filled with blanks or "no-data" words and if the loop is longer than the buffer, it is simply not possible to use the buffer store for any instruction buffering at all.

No system is known in the prior art wherein provision is made for automatically storing one or more program loops of arbitrary length while retaining the advantages of loop buffering even though the loops to be stored may be larger than the buffer storage space allocated to this function.

Summary of inventive concepts and objects

It has now been found that a highly versatile Instruction Buffering System may be realized by providing a high speed multi-instruction word storage capacity within the instruction unit whereby program loops may be stored in the buffer upon instruction by the programmer whence they are automatically accessed in subsequent references. By providing the ability to store more than one loop and to main the effectiveness of the system even though all of the individual instructions of a given loop may not be contained within the local storage a greatly improved Instruction Buffering System is obtained.

It is accordingly a primary object of the present invention to provide an instruction buffering system capable of storing a plurality of separate instruction loops and for automatically accessing them from the buffer store.

It is yet another object of the invention to maintain the advantages of the buffering system even though the given loop which it is desired to store exceeds the capacity of the buffer.

It is a still further object of this invention to provide such an instruction buffering system which is substantially compatible with more or less conventional instruction execution units.

The objects of the present invention are accomplished in general by an instruction buffering system for automatically storing an accessing sequences of instructions may require repetitive performance by the main computer which the instruction buffering system services. This system includes means for detecting that a given program loop is to be performed and the means for storing instructions of this loop locally. A buffer is provided for storing said instructions as they are being first fetched from Main Memory by the instruction unit. Further means are provided for indicating that the buffer memory is full and for terminating the loading of said buffer even though the entire instruction sequence may not yet be accessed therein. Further means are provided for recognizing instructions that currently reside in local storage (besides existing in Main Memory) and for causing same to be retrieved directly from said buffer memory and for initiating the conventional Main Memory fetch operation otherwise.

Additionally, means are provided for storing more than one program loop in the buffer memory until said memory is filled. Means are additionally provided for accessing the memory at the beginning of the desired loop and for accessing the instruction sequence from memory beginning at this beginning or origin address and continuing until the instruction sequence is either completely extracted or a determination is made that the remainder of the sequence is stored in Main Memory as no more capacity was left in the buffer memory.

In practicing this invention, the programmer must indicate in his program that a program loop begins at a designated instruction, thereby implying a request for the loop to be stored in the instruction buffer. Once this is done, the operation of the system is automatic. Each time an instruction address is generated by the Instruction Counter, it is examined by the instruction buffering system and a determination is made as to whether or not the instruction so designated has previously been stored in the buffer memory. If not, the instruction is fetched from Main Memory and stored in the buffer memory concurrently with or slightly after the instruction is supplied to the execution unit of the computer. If on the other hand, the instruction is found to be currently stored in the buffer memory it will be fetched from the buffer and no Main Memory cycle will be called for. The system is essentially self contained utilizing the main computer Instruction Register and Instruction Counter and will be explained more fully subsequently. An important advantage of this system is that it makes programs independent of the size of the Instruction Buffer provided. These programs can even be run without changes on conventional machines having no buffer but otherwise unchanged instruction registers, if only the indications of loop beginnings are interpreted as no-ops. It will be noted that while a number of operations must be performed and certain determinations made based on a given instruction address, these operations may be accomplished by means of high speed circuitry and can be overlapped in time with other system functions. Thus, they do not hold up the overall instruction execution speed if instructions are not fetched from the buffer, while saving substantial amounts of time if it is found that a given loop is stored in the instruction buffering above.

Drawings

Figure 1:
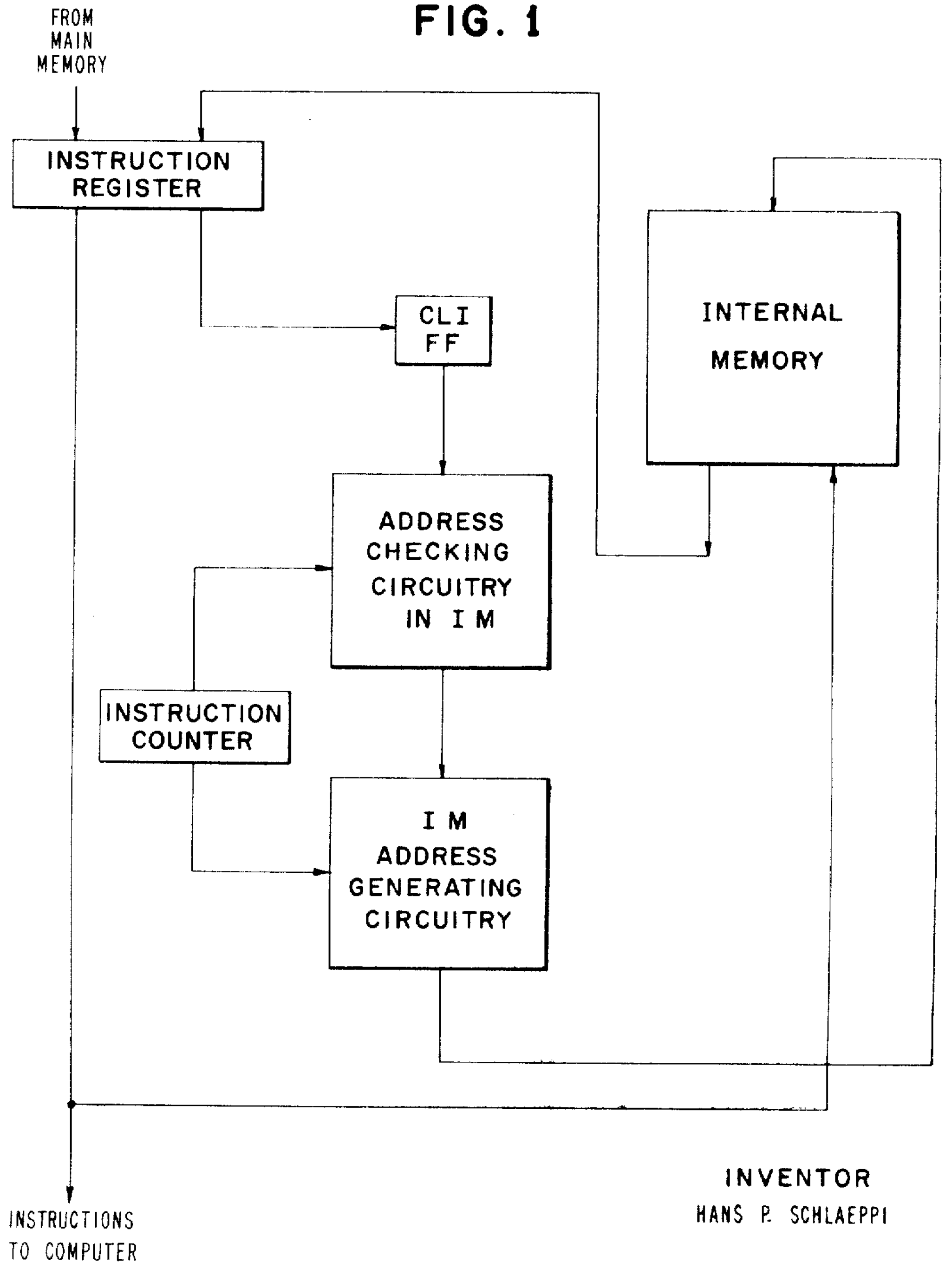
FIG. 1 is a functional block diagram of the major functional components of the present instruction buffering system.

FIGS. 3*a*–3*g* constitute a logical schematic diagram of a preferred embodiment of the instruction buffering system shown functionally in FIG. 1.

Figures 3, 3A:
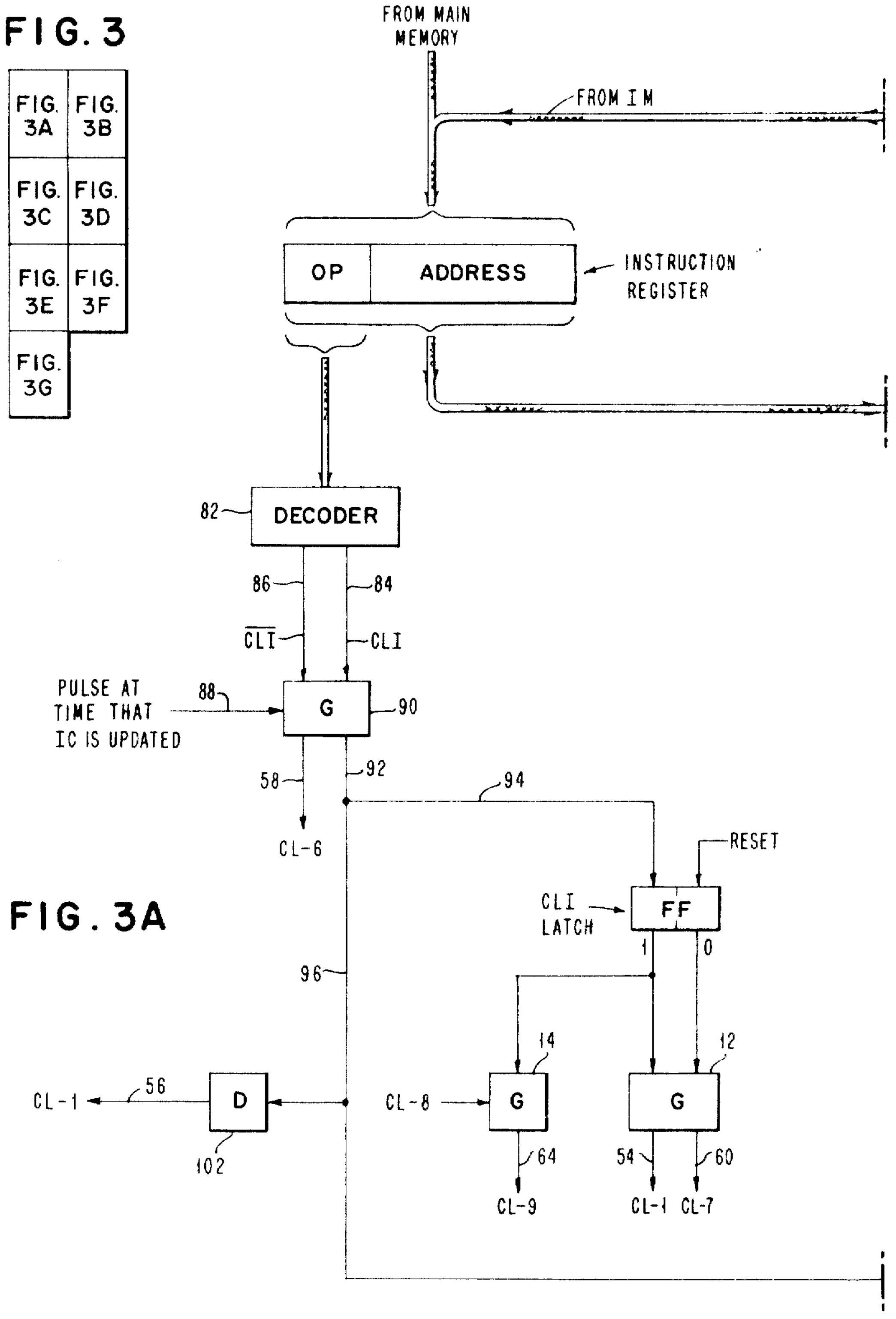
FIG. 3 is a diagram detailing the organization of FIGS. 3*a*–3*g*.
Figure 3B:
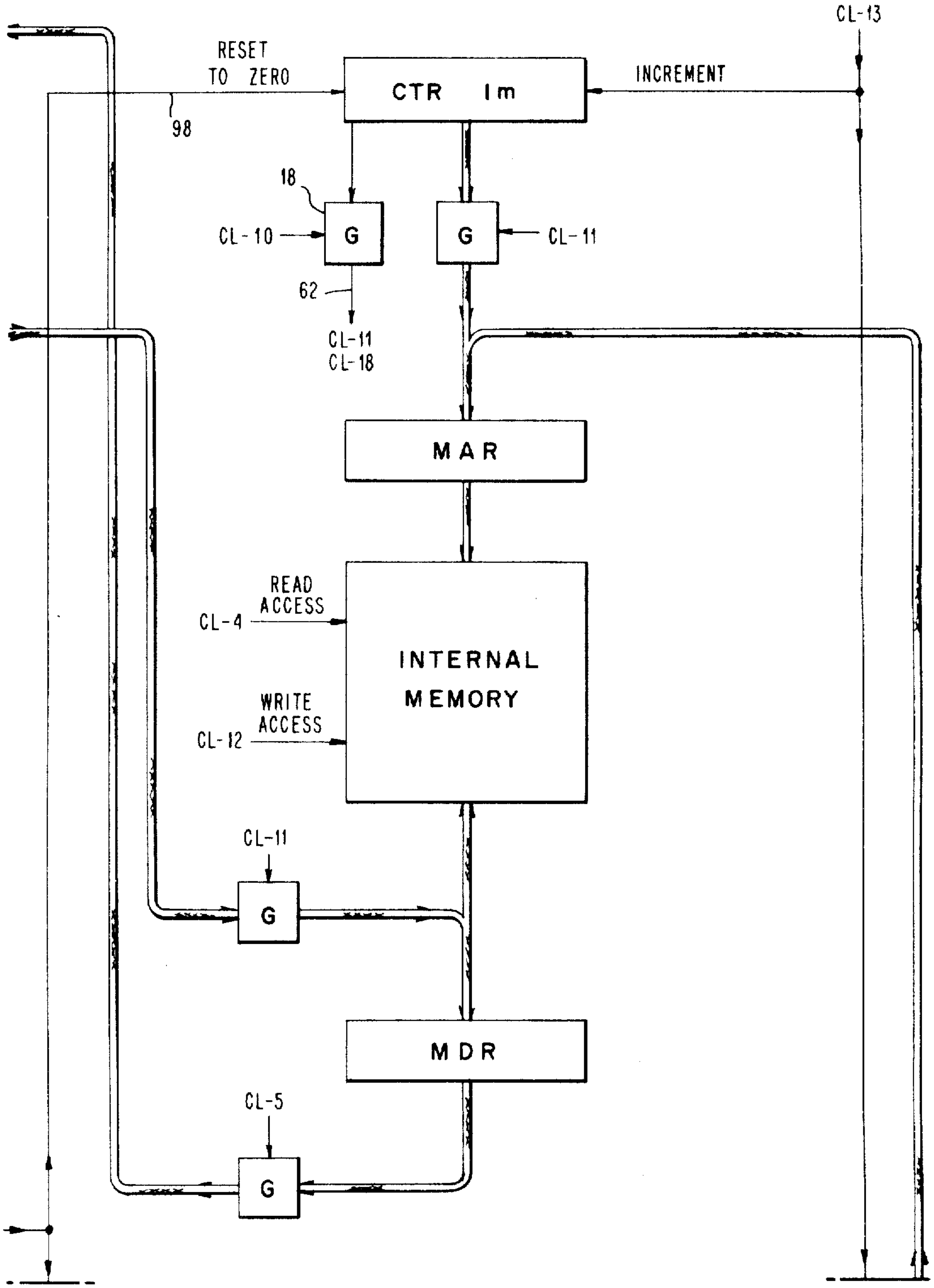
Figure 3C:
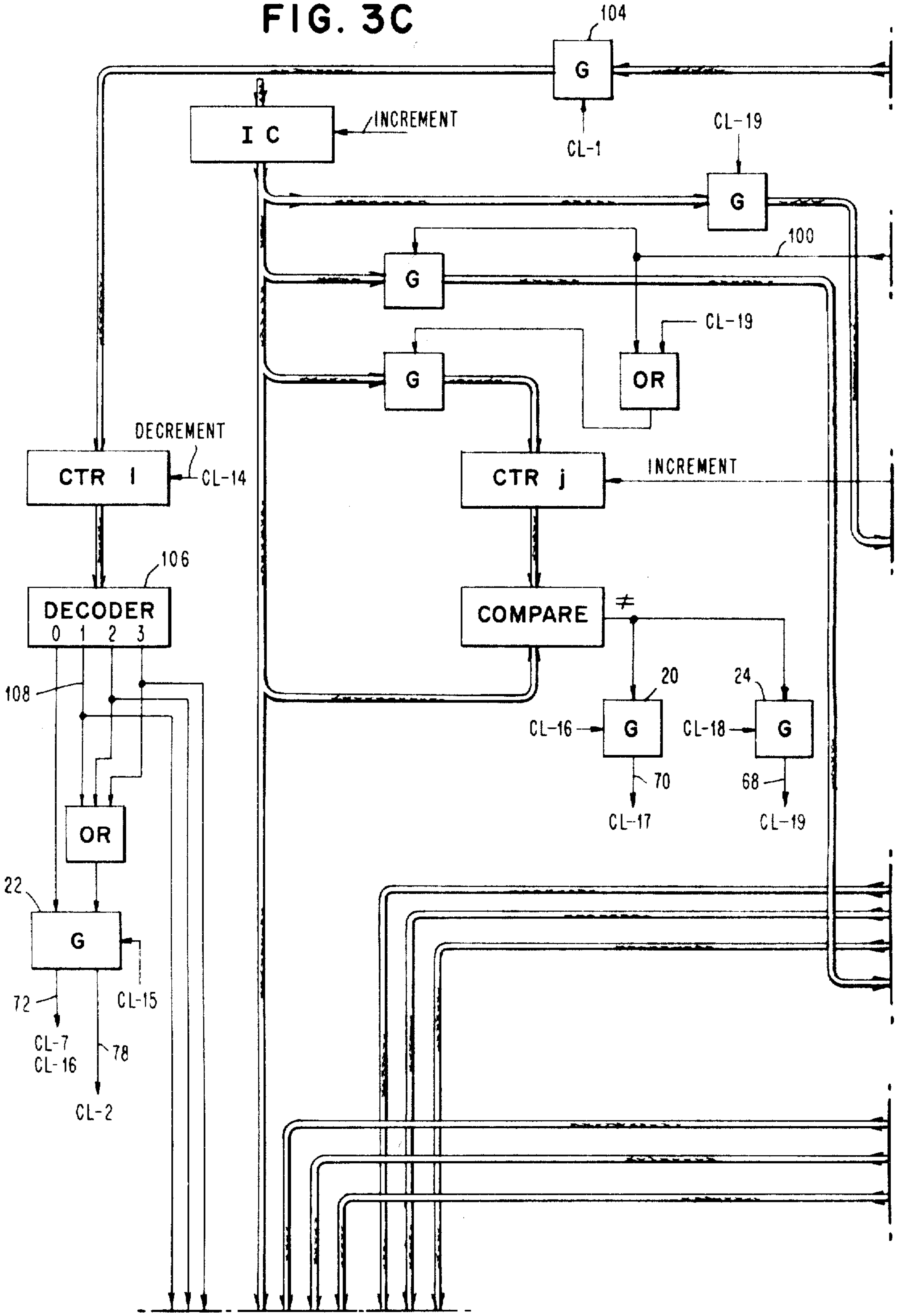
Figure 3D:
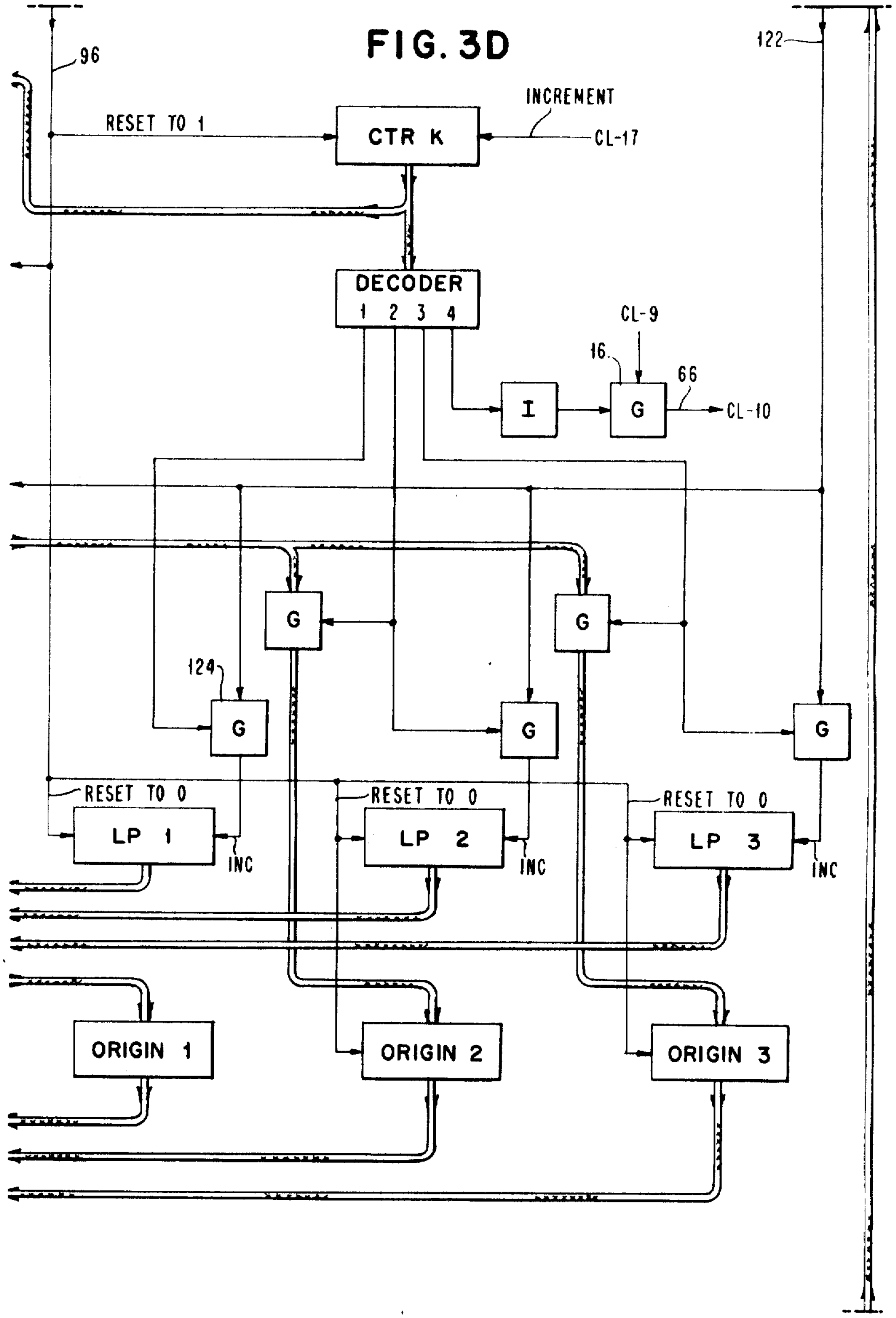
Figure 3E:
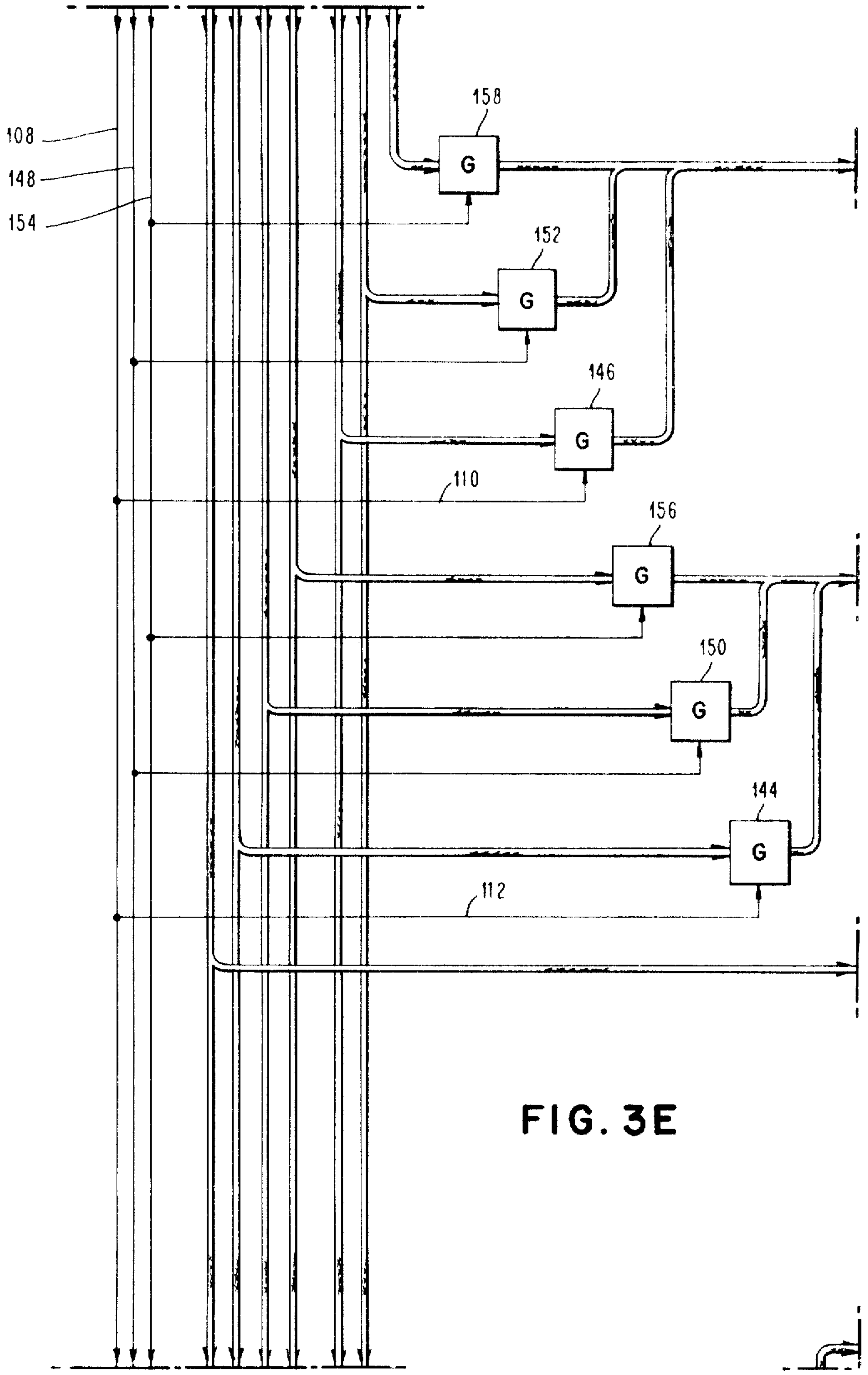
Figure 3F:
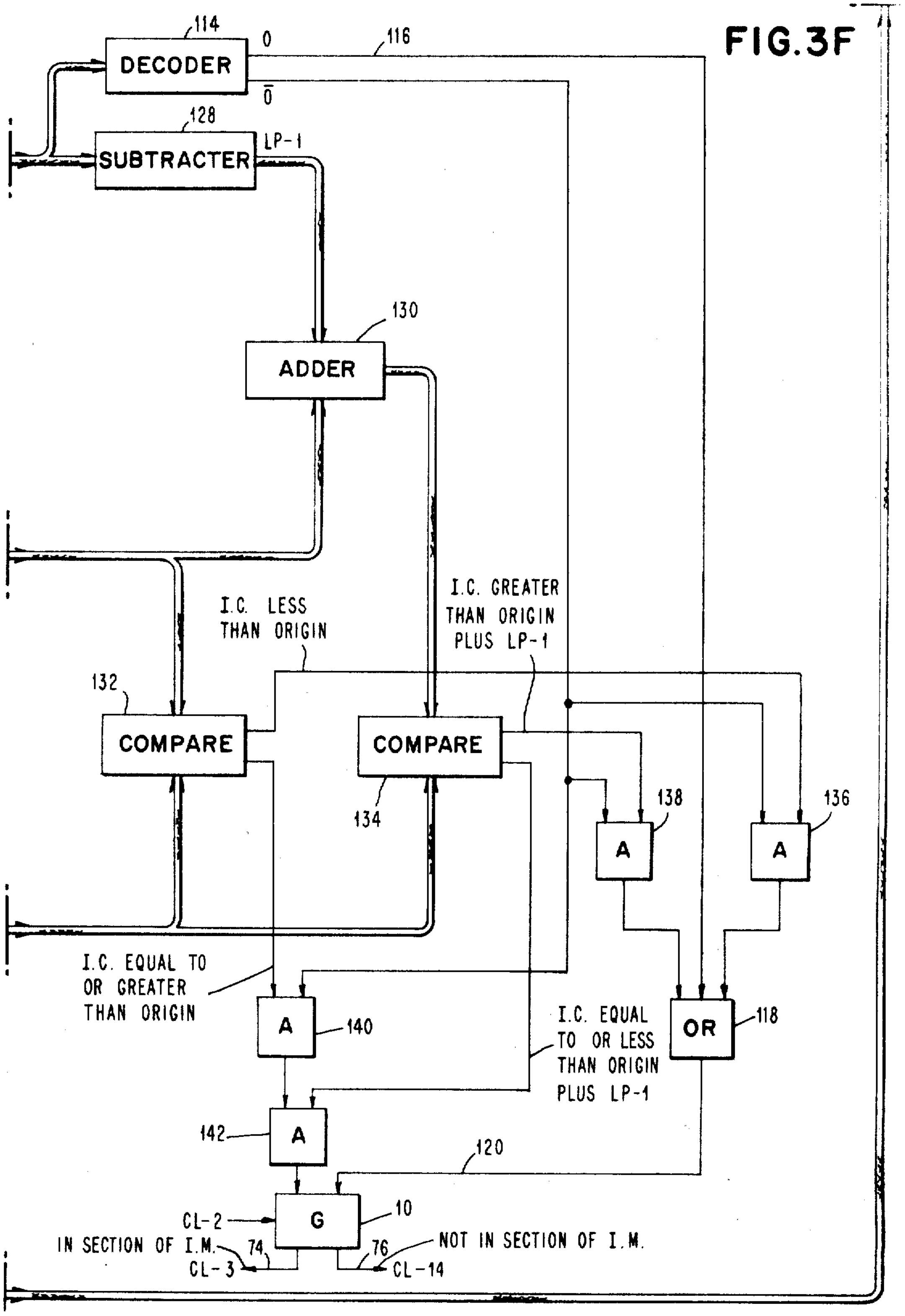
Figure 3G:
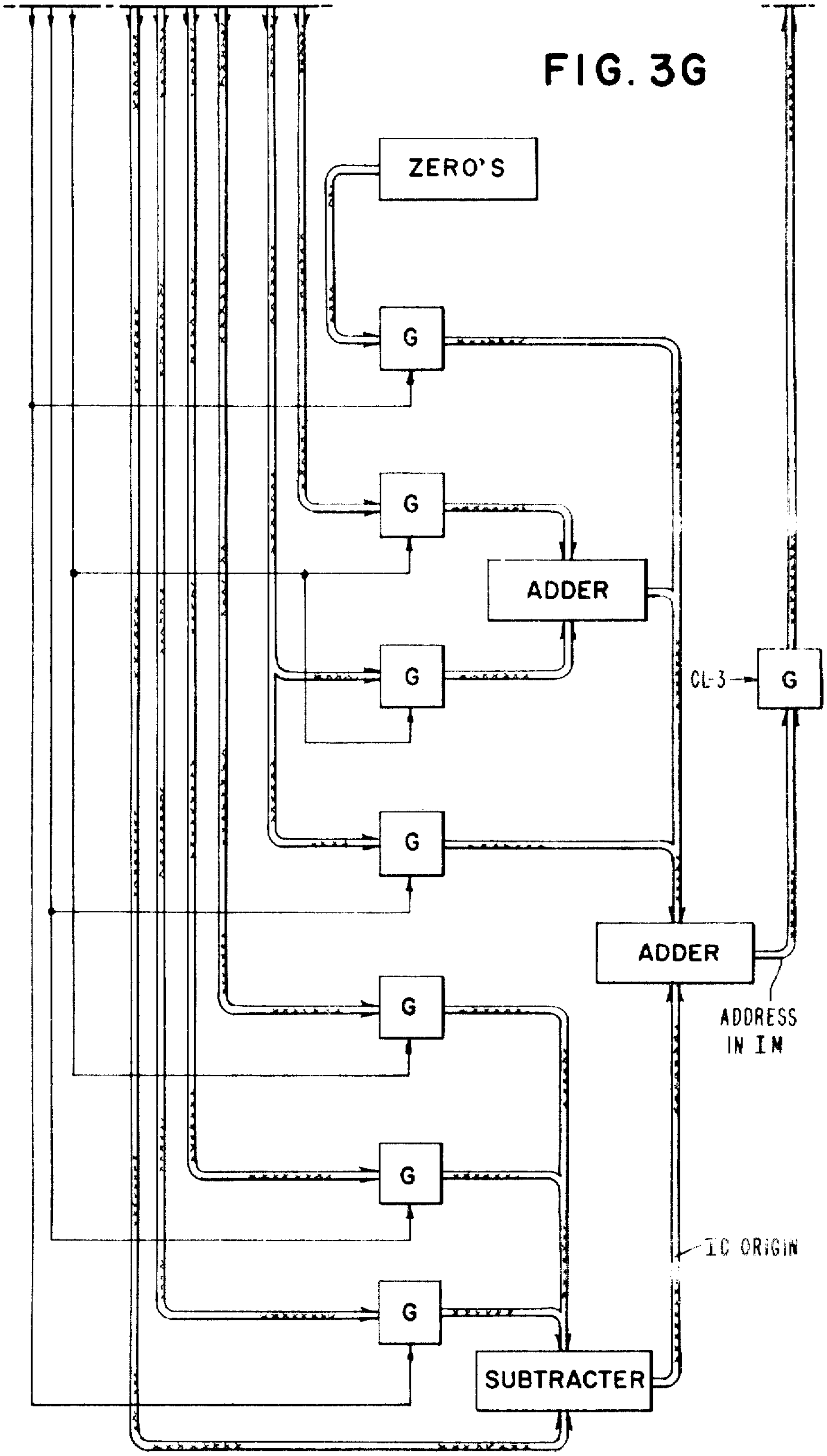
Figure 4:
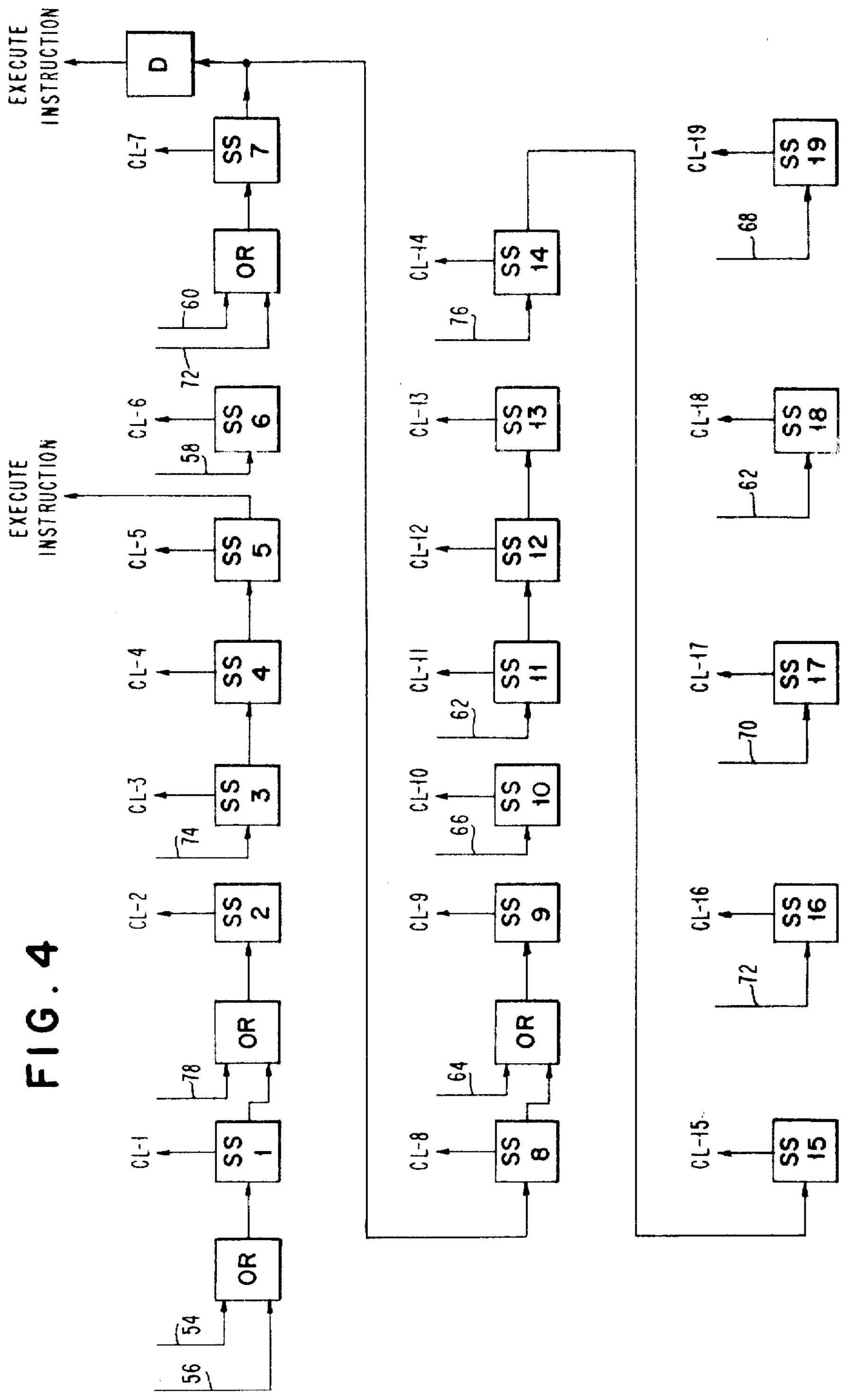

FIG. 4 is a logical schematic diagram of the sequencing circuits for the system illustrated in FIGS. 3*a*–3*g*.

Description of disclosed embodiments

The invention will now be described in more detail with reference to the accompanying drawings. As will be remembered, when the present system, is initiated on a fresh program, the primary decisions that the hardware must make is whether each instruction is to form part of a loop which the programmer desires to have stored in the local store (henceforth called Internal Memory) that is part of the instruction buffering system. If not, the instructions are dispatched to the execution unit in the normal fashion and the present system is effectively inoperative. If, however, it is decided that a particular instruction is part of a program loop to be buffered, the system first examines its address as contained in the Instruction Counter to determine if it has been previously stored in the Internal Memory. If the answer to this is negative, the system generates an appropriate address for its Internal Memory and transfers the complete instruction from the Instruction Register into said Internal Memory. If on the other hand it is found that the instruction has already been stored in the Internal Memory on a previous cycle, the system generates the address where this desired instruction resides in Internal Memory. Then, it retrieves this instruction directly from the Internal Memory, placing it into the Instruction Register. Thus, it avoids a Main Memory cycle. The details of the manner in which more than one loop is recognized, stored and read out of the system as well as the manner in which the various addresses are generated and tests are made is shown in the detailed description of the embodiment of FIG. 3 (3A–3G.).

Referring now to the function block diagram of FIG. 1, the major blocks whose functions were described generally above are shown. As described subsequently, the Instruction Register and Instruction Counter shown in this figure are conventional units as are used in any computer system and their use in the present system is in addition to their normal use in the conventional computer for accessing instruction sequences and supplying to said computer for execution. The block marked CLIFF refers to a Flip-Flop in this system which indicates whether the instruction buffering system has been activated. Activation and deactivation of the buffering system can be conveniently performed by special instruction. When this Flip-Flop is about to be set, the system knows that the subsequent instruction sequence is to be stored in the Internal Memory. By way of explanation CLI designates an instruction Commence Loading Instructions. The output of the box marked CLIFF is shown going to the box labelled Address Checking Circuitry in IM. This circuitry utilizes the instruction address currently in the Instruction Counter and checks the addresses which the system has stored in Internal Memory determining whether or not this instruction has already been stored. If it is found that this instruction has previously been stored, its address in the Internal Memory must be reconstructed using in combination the current contents of the Instruction Counter, Origin Registers, and the LP Registers to be described later on. If on the other hand it is found that the instruction has not yet been stored in the Internal Memory, then the address in Internal Memory must be generated and a record of this address must be kept in the Origin and LP Registers as will likewise be described in detail subsequently. These functions are both denoted on FIG. 1 as being performed by the block IM, Address Generating Circuitry, which is shown as being fed from the bottom of the Address Checking Circuitry box. It will be apparent from the subsequent description that a great deal of the circuitry including the various counters and storage registers, etc., are in effect utilized for both of the "Address" functional units. Relative to the box marked Internal Memory here addresses are shown going into the IM at the top and the data paths are shown going into and coming from the Internal Memory at the bottom, as is the usual practice. As indicated previously, the data flow is from the Internal Memory to the Instruction Register when a desired instruction is stored therein and conversely the data flow is from the Instruction Register into the Internal Memory when it is found that a given instruction is part of a loop to be stored but that it is not currently in the Internal Memory, although the latter still has unused capacity.

The presently disclosed system permits the storing in the internal memory (IM) of a plurality of loops rather than just one. This is accomplished by providing a plurality of "Origin" registers and an equal number of LP Counters. Each Origin Register and its associated LP Counter will specify a portion of Main Memory that may contain part or all of a program loop that are collectively small enough to find a place in IM.

In operation, upon the recognization of CLI instruction, the first loop is stored in a section of IM beginning with the IM address of zero. The address of the first instruction in the loop is obtained from the Instruction Counter and stored in the Origin #1 register and the LP #1 Counter is advanced. As each instruction is stored in IM, a sequence check is made on the IC the first time the loop is executed. The ascending order sequence will be broken when the loop is closed, and this event is detected. The break in sequence is not used if the instruction transferred to is in IM. If the sequence is broken and the instructions are not in IM it means that the program has branched to a new loop. The starting instructions of the new loop is then put into Origin #2 and the loop is stored as before in the adjacent section of IM. It will now be obvious how still more loops can be stored until the supply of Origin registers and LP counters runs out or until the capacity of the IM is reached.

Figure 2:
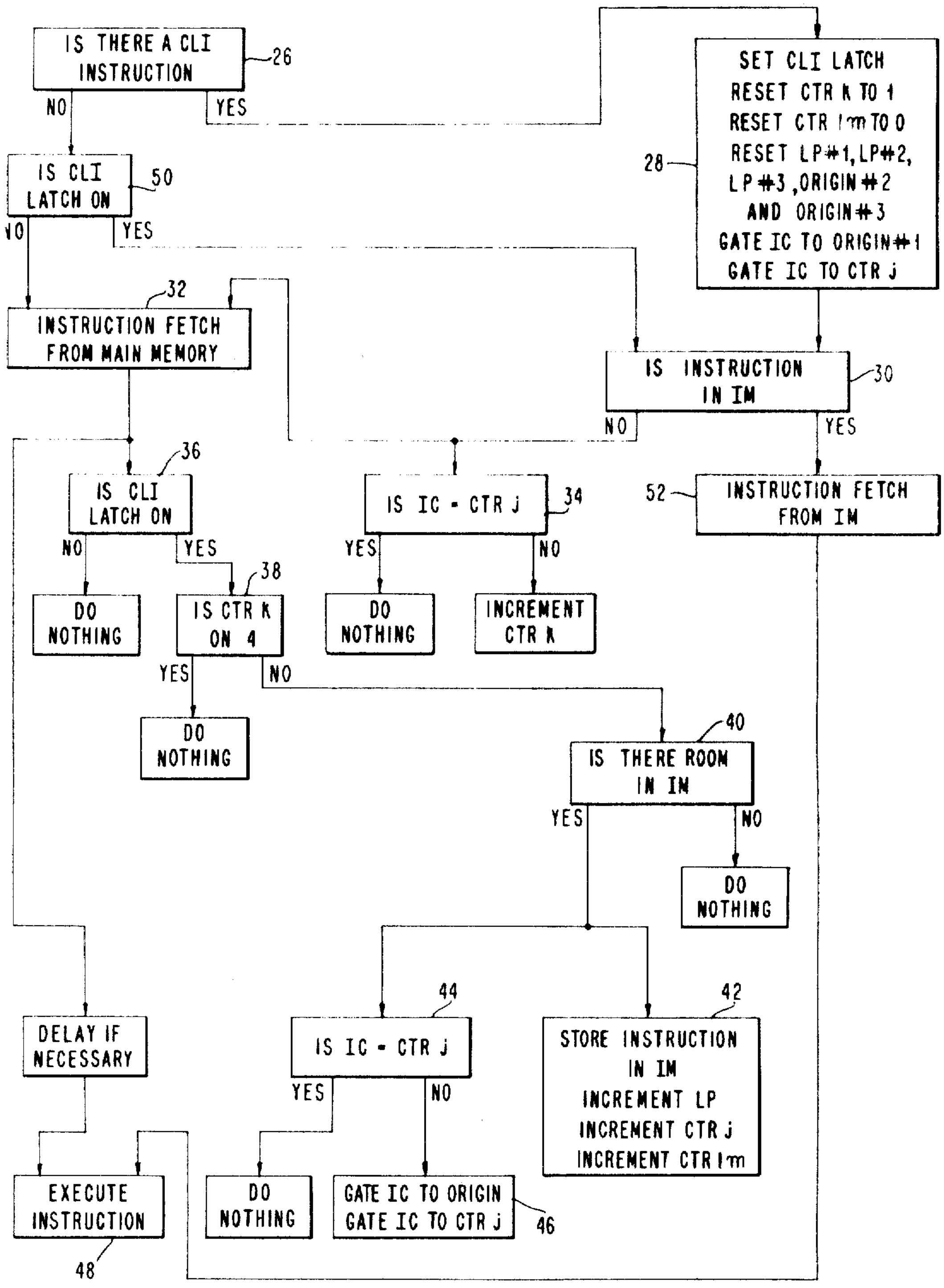
FIG. 2 is a flow chart showing in detail the sequence of steps and tests which are made by the present system in performing an instruction irrespective of whether it has been previously stored in the buffer or not.

A more detailed description of the operation of the system can best be understood by referring to the flow chart of FIG. 2. It is assumed that, at the time that the Instruction Counter (IC) is incremented or has its contents replaced by a new address, a pulse is available which interrogates the OP code of the Instruction Register to see if it is a CLI Instruction or not. This interrogation is represented on FIG. 2 by box 26. If a CLI instruction is sensed, the events listed in rectangle 28 occur. Counter *k* keeps track of the Origin Register and thus of the loop that is in current use. Counter *lm* keeps a running total of the LP Counters. Counter *j* is used for the sequence check. The CLI latch is set by the CLI instruction and it is understood that this latch can be reset by any desired means (not shown ) such as another instruction, a change in the operating mode of the machine, the initial start of the machine, etc.

When these initial events are accomplished, a sequencing circuit is started in order to run through the sequence of events shown on FIG. 2. The first question to be asked is "Is the instruction in IM?" (box 30).

The functions of box 30 are of course described in detail subsequently. However, generally the manner in which IM is searched for the specified instruction address is as follows. The address of the desired instruction is compared with the current contents of the origin registers. If any origin is found to be smaller than the desired address, the difference is compared with the contents of the corresponding LP counters. If the difference is found to be not larger than one of the LP counters, the requested instruction is in the corresponding section of the Internal Memory. The precise location of this instruction within the Internal Memory is given by the origin of the section containing it augmented by said difference. In the presently disclosed embodiment the capacity for storing three program sections is illustrated by way of example.

Referring now again to FIG. 2 and the previously discussed example, the answer to the question "Is the instruction IM?" will be "no" and the sequence will initiate an instruction fetch from main memory (box 32). At the same time, the address sequence is checked (box 34). Counter *j* will be equal to IC and therefore nothing will be done since the sequence is not broken. After the Instruction Fetch the CLI latch is tested (box 36). In this case, it will be "on" and Counter *k* will be checked to see if all the Origin Registers and associated LP counters have been used up or not (box 38). In our example, Counter *k* contains 1 so the sequence will proceed to check if there is still space in the IM (box 40). In this case it will find space so the instruction will be stored in the IM (box 42). After the instruction is stored the LP #1 counter, Counter *j* and Counter *lm* will be incremented. A parallel operation takes place as indicated by boxes 44 and 46. It is necessary to again make a sequence check because if there had been a break in sequence, counter *k* would be incremented (box 34). If a break in sequence occurs it means that a new program sequence is about to be stored and therefore the first instruction of that loop must be gated to the proper Origin Register and to Counter *j*. If step 46 is necessary, it is assumed that it occurs before Counter *j* is incremented in step 42. If necessary, the incrementing of Counter *j* may be delayed until step 46 is accomplished. It will be noted in FIG. 2 that after the instruction fetch from Main Memory (box 32) the machine proceeds to execute the instruction (box 48). This can be delayed if necessary to permit time for the events just described to be accomplished. In this manner the first instruction of the first loop is executed as well as stored in IM.

As successive instructions of the first loop are read they are routed to box 30 (FIG. 2) via box 50 and stored in the IM. When the program branches back closing the loop, box 30 will have an output to rectangle 52 and the instruction fetch will be from IM.

The operation of the system in detail can be understood by referring to FIGS. 3A–3G which comprise a logical diagram and to FIG. 4 which illustrates the sequencing circuit. The sequence steps are enumerated subsequently in the specification.

In FIG. 4, the sequence is represented by a series of Single Shot multi-vibrators. For example, S.S. 1 can be turned "on" by a pulse on either of lines 54 or 56. During its "on" period, the line CL–1 will be active. When S.S. 1 goes off, it delivers a short pulse on line 80 which is used to turn on S.S. 2 etc.

Before proceeding with the detailed description of the operation of the system with respect to logical diagram of FIGS. 3A–3G, a number of general comments about the functions of the various sections of the embodiment are in order. On FIG. 3A it will be noted that the Instruction Register appears together with the CLI latch. It is the setting of this CLI latch which actually triggers the operation of the remainder of the system as stated previously and as described in detail subsequently. The Internal Memory appears on FIG. 3B with its associated MAR and MDR for supplying addresses and data respectively. At the top of FIG. 3B appears the Counter *lm* which as will be appreciated subsequently generates the actual addresses in the Internal Memory where the instructions are stored. The Counter *j* is located on FIG. 3C as is the Instruction Counter and also Counter *l*. The Counter *j* is used in conjunction with the contents of the Instruction Counter to determine whether the successive instructions are part of a current loop or represent a new loop. The Counter *l* is utilized in conjunction with the Counter *k* to search successive portions of the Internal Memory to determine whether a requested instruction is stored therein. Counter *k*, the LP Counters and the Origin Registers are located on FIG. 3D. The Counter *k* is used to control the starting of successive loop areas in the Internal Memory and it is under control of this Counter that the proper Origin Register and its associated LP Counter will be selected for given storage operations. The Origin Registers are utilized to store the actual instruction address from the instruction counter to facilitate subsequent accessing of same and the associated LP counters and in essence keep track of the number of instructions stored in each loop. The arithmetic circuitry shown on FIG. 3F performs the actual function of comparing the various contents of the LP counters, the Origin Registers and the Instruction Counter to determine whether a given instruction lies within the related section of Internal Memory. The arithmetic circuitry shown on FIG. 3G generates the proper address in the Internal Memory and supplies same to the Memory Address Register when it is determined that a given requested instruction whose address is supplied to the Instruction Counter is actually stored in said Internal Memory. It will of course be appreciated that the address currently stored in the Instruction Counter will in all probability have no relationship to the address in the Internal Memory where it is stored. Thus, this address in the Internal Memory must be reconstructed from the contents of the LP Counters as will be explained subsequently.

Referring now specifically to FIG. 3, the Instruction Register IR can be loaded either from Main Memory or from IM. The OP Code portion of the IR is applied to the Decoder 82 which has an output on line 84 if there is a CLI instruction or on line 86 if there is no CLI instruction.

A pulse applied to gate 90 on line 88 will sample lines 84 and 86. If line 84 is active, a pulse will appear on line 92 which extends via line 94 to set the CLI latch. A branch circuit exists on lines 96 and 98 which is used to reset Counter *lm* to zero. Wire 96 extends to wire 100 (FIG. 3) which is used to gate the contents of the IC to the Origin #1 Register and to Counter *j*. Wire 96 is further effective to reset LP #1, LP #2, LP #3, origin #2 and origin #3. Counter *k* is rest to *l*. These are the operations shown within rectangle 28 on the flow chart, FIG. 2. Wire 96 also feeds the delay unit 102 (FIG. 3). The output of which appears on line 56 which extends to FIG. 4 and is effective to turn on S.S. 1 of the clock. If line 86 instead of line 84 were active the gate 90 would have an output on line 58 which extends to FIG. 4 and is effective to turn on S.S. 6.

If it is assumed that the first CLI instruction has just been encountered, the following events will take place. S.S. 1 (FIG. 4) will have an output on line CL–1 which is applied to gate 104 (at the top of FIG. 3) in order to gate Counter *k* to Counter *l*. Counter *k* counts up to four. Further incrementing pulses cannot advance it. Counter *k* is gated to Counter *l* in the following manner.

A "four" in Counter *k* is gated to Counter *l* as a "three."

A "three" in Counter *k* is gated to Counter *l* as a "three."

A "two" in Counter *k* is gated to Counter *l* as a "two."

A "one" in Counter *k* is gated to Counter *l* as a "one."

In the example being described, Counter *k* is on "one" and Counter *l* will be on "one." The Decoder 106 (FIG. 3) will have an output on line 108. Line 108 extends to FIG. 3 where it feeds lines 110 and 112. Line 110 gates LP #1 to the decoder 114 which has an output on line 116 which extends through the OR circuit 118 to line 120 which goes to gate 10.

When S.S. 1 goes off, it turns on S.S. 2 (FIG. 4) and the line CL–2 becomes active. This line extends to the bottom of FIG. 3 where it is applied to gate 10. Line 76 will become active and is effective to turn on S.S. 14. The CL–14 pulse is used to decrement counter 1 which in this case goes from "one" to "zero." When S.S. 14 goes off, it turns on S.S. 15 and the CL–15 pulse is used to sample gate 22. Line 72 becomes active and turns on both S.S. 7 and S.S. 16. CL–7 causes any instruction fetch from Main Memory. CL–16 tests gate 20. In this case, gate 20 will have no output because IC is equal to Counter *j*. When CL–7 goes off, the instruction will be executed and S.S. 8 will be turned on. The CL–8 pulse tests gate 14 and, because the CLI latch is "on," there will be an output on line 64 which turns on S.S. 9. CL–9 tests gate 16, and line 66 will have an output because Counter *k* is not on 4. S.S. 10 will be turned on. CL–10 tests gate 18 and line 62 will be active because there is room in IM. Line 62 turns on S.S. 11 and S.S. 18. CL–18 tests gate 24 but is ineffective at this time because IC is equal to Counter *j*. CL–11 gates the contents of IR to the MDR of the IM. It also gates Counter *lm* (which at this time is on zero) to the MAR of the IM. When S.S. 11 goes off, it turns on S.S. 12. CL–12 (FIG. 3) causes a "Write" access for the IM. S.S. 13 is turned on when S.S. 12 goes off. CL–13 is effective via line 122 to increment Counter *lm*, LP #1 and Counter *j*. It will be noted that the incrementing pulse to LP #1 is via gate 124 which is enabled because Counter *k* is on "one." This completes the detailed description of how the first instruction of the first loop is stored in IM.

The next instruction will not be a CLI instruction so the output of gate 90 (FIG. 3) will be on line 58 which turns on S.S. 6 (FIG. 4). CL–6 will interrogate the gate 12 (FIG. 3) and line 54 will become active which will turn on S.S. 1. From this point on, the sequence of events for storing the second instruction of the loop is the same as described for the first instruction of the first loop. Successive instructions of the first loop will be handled in a similar manner.

When the address in the IC is changed to the address of the first instruction of the first loop (first loop loops back on itself) rectangle 30 of FIG. 2 will have an output on the "yes" line. The way this output is obtained is as follows. The following three statements must be satisfied if the instruction is in the IM.

(1) If the instruction is in IM, LP must be greater than zero.

(2) If the instruction is in IM the address of the instruction must be equal to or greater than the origin.

(3) If the instruction is in IM, the address of the instruction must be equal to or less than origin plus LP minus 1.

The logic to accomplish these tests is shown on FIG. 3. Decoder 114 accomplishes the first test and if LP is zero, it is not necessary to make the next two tests. If LP is not zero, line 126 is active and this line will test the next two statements. If either test fails, the instruction is not in IM. If both tests succeed, the instruction is in IM. The Subtracter 128 produces the difference, LP minus 1. The Adder 130 adds the difference to the origin. The Compare Units 132 and 134 perform the comparison needed for the second and third statements. For example, if the first statement succeeds and the second statement fails, AND circuit 136 will be satisfied and will have an output to OR circuit 118 which indicates that the instruction is not in the section of IM. If the first statement succeeds and the third fails, AND circuit 138 will have an output to OR circuit 118. If the first and second statements both succeed, AND circuit 140 will have an output which is applied to AND circuit 142. If the first, second and third statements all succeed, AND circuit 142 will have an output which will indicate that the instruction is in IM. It will be noted that origin #1 and LP #1 are gated to the test circuits when Counter *l* is on "one" by the line 108 and gates 14 and 146. Origin #2 and LP #2 are gated to the test circuits when Counter *l* is on 2 by means of line 148 and gates 150 and 152. Origin #3 and LP #3 are gated to the test circuits then Counter *l* is on 3 by means of line 154 and gates 156 and 158. The level that exists in Counter *l* when it is loaded from Counter *k* is tested first and if the instruction is not in that section of IM, Counter *l* is decremented and the next lower section of IM is tested. This happens until Counter *l* reaches zero which is an indication that the instruction is not in IM. The way in which this is done is as follows:

Assume that Counter *l* is on "3." Clock pulse CL–2 (FIG. 3F) will first test section #3 of IM. If the instruction is not there, line 76 will have an output which turns on S.S. 14. Clock pulse CL–14 will decrement Counter *l* and turn on S.S. 15. CL–15 will test Counter *l* for the presence of a zero. Counter *l* will be on "2" so the clock will branch back to CL–2 which tests the second section of IM for the presence of the instruction. If the instruction is not in the second section of IM, the clock loop will be repeated. Counter *l* will be decremented to "1" and the #1 section of IM will be tested. If the instruction is not in this section Counter *l* will again be decremented this time to zero and now when Counter *l* is interrogated by CL–15, the clock will branch to CL–7 and CL–16. This branch corresponds to the "no" output of rectangle 30 on FIG. 2.

Before an instruction fetch from IM can be accomplished, the address of the instruction in IM must be determined. The rules for them are as follows: If Counter *l*="1," address in IM=(IC minus Origin #1.) If Counter *l*="2," address in IM=(IC minus Origin #2 plus LP #1). If Counter *l*="3," address in IM=(IC minus Origin #3) plus (LP #1 plus LP #2).

The logic to perform the above is shown on FIG. 3 and it is believed that little explanation is needed. When Counter *l* is on "1," zeros are added to the difference of the IC and the Origin #1. As will be noted, when an instruction is found in IM the clock branches to CL–3 and CL–3 is used to load the MAR of the IM.

The following list of clock sequences specifies the particular operations performed by and during each clock period. System branch points are also clearly indicated.

CL–1: Gate Counter *k* to Counter *l*→CL–2
CL–2: Test gate 10 if address is in section of IM gated by Counter *l*→CL–3 if address is not in section of IM gated by Counter *l*→CL–14
CL–3: Gate address to MAR of IM→CL–4
CL–4: "Read" access IM→CL–5
CL–5: Gate MDR of IM to Instruction Register→Execute Instruction
CL–6:
  Test gate 12
  If CLI latch on "1"→CL–1
  If CLI latch on "0"→CL–7
CL–7:
  Instruction fetch from Main Memory→CL–8
  →Execute Instruction (after delay)
CL–8:
  Test gate 14
  If CLI latch on "1"→CL–9
CL–9:
  Test gate 16
  If Counter *k* is not on "4"→CL–10
CL–10:
  Test gate 18
  If there is room in IM→CL–11, →CL–18
CL–11:
  Gate Instruction Register to MDR of IM,
  Gate Counter *lm* to MAR of IM→CL–12
CL–12: "Write" access in IM→CL–13
CL–13:
  Increment—LP (gated by Counter *k*)
  Increment—Counter *j*
  Increment—Counter *lm*
CL–14: Decrement—Counter *l*, →CL–15
CL–15:
  Test gate 22
  If Counter *l* is not on zero→CL–2
  If Counter *l* is on zero→CL–16, →CL–7
CL–16:
  Test gate
  If IC not equal to Counter *j*→CL–17
CL–17: Increment Counter *k*
CL–18:
  Test gate 24
  If IC not equal to Counter *j*→CL–19
CL–19:
  Gate IC to Origin
  Gate IC to Counter *j*

The above description of the disclosed embodiment clearly illustrates the operation of a relatively powerful version of the present invention. In its simplest form, it would of course be capable of storing only one program section. An additional feature which could be included in such a buffering system would be the provision of a number of locations within the IM for other system uses, this number being a program parameter. E.g. an interpretive implementation of a programming language having block structure (such as ALGOL or PL/I) requires a number of data-address base-registers equal to the number of program blocks that enclose statically the current instruction. The extended IM scheme could provide exactly as many IM locations for such a system's purpose at any time as are required at that time, leaving all the other IM locations available for instruction buffering.

This feature could be implemented by means of an additional pointer register containing a "limit pointer" (TP) against the contents of which LM is compared each time before an LP is incremented. The current contents of TP, hence, limits the IM space available for instruction buffering, so that the remainder of IM can be used for other purposes such as those mentioned above. Changing the contents of TP would be an administrative function that would be explicitly called into play by the system each time the relative allocation of IM regions is changed; e.g. in dynamic storage allocation, each time a new program block is entered one of the things to be done automatically by the system is that the TP would be decremented by unity (conversely upon leaving a block), thereby effectively curtailing the available IM buffer storage by one word. If, at that time, the IM were full, then the LP would have to be decreased as well. The above is but one system modification and is only exemplary of many possible with the present buffering mechanism.

Conclusions

The above detailed description of the disclosed embodiment of the invention clearly illustrates the operation thereof. It is thought that the advantages of the system in terms of reduction in main memory access time should be quite apparent at this point. Further, these advantages may be realized with an absolute minimum of effort on the part of a programmer who has to know only that it is necessary to indicate the beginning of a loop which he desires to store in the system Internal Memory. While it is advantageous for a programmer to know how many loops the system is able to store as it is limited by the numbers of pairs of Origin and LP Registers provided, it is not necessary that he be aware of the exact number of instruction storage locations provided in said Internal Memory. As should be clear from the previous description, the operation of the system is self contained and as soon as the Internal Memory is filled the instructions are accessed from Main Memory in the conventional fashion without over writing the Internal Memory, thereby maintaining its usefulness in that instruction already stored therein may be reaccessed as soon as they are called for by the program.

While the disclosed embodiment is believed to be a satisfactory design compromise for such a system, it will be readily apparent that many changes in form and detail of the system are readily possible. For example, a somewhat different timing system than the purely synchronous sequencer consisting of a series of single shot multi-vibrators could be used. Similarly provision could readily be made for storing more or fewer loops within the Internal Memory by appropriately applying more or less hardware. Further, a number of logical components such as compare circuits, etc. could be eliminated by appropriate gating and timing circuitry wherein one or two compare circuits could perform all of the comparison functions.

The CLIFF latch may be entirely omitted in case a basic system comprising a single Origin and LP pair is used. In this case the IM would always contain the program section following, in ascending address sequence, the last CLI instruction executed. The first branch instruction executed after said CLI instruction would terminate loading of the IM. When another CLI instruction would be executed, the previous contents of IM would be overwritten by the program section following, in the Main Memory address space, that other CLI instruction. This basic system would be satisfactory for buffering the innermost loop of a nest of loops, which of course is the most frequently executed program section.

While the invention has been particularly shown and described with reference to preferred embodiments thereof, it will be understood by those skilled in the art that various changes in form and details may be made therein without departing from the spirit and scope of the invention.

What is claimed is:

1. In a computer system, an instruction buffering system for storing sequences of instructions forming program loops comprising:

means for extracting instructions from the main computer memory, means for evaluating said instructions, means for indicating that a program loop is about to be performed by the computer system, a buffer memory, means responsive to said indicating means for transferring subsequent instructions from said evaluating means to said buffer memory as they are being performed, means for indicating that said buffer is full, means responsive to said last named means for terminating the loading of said buffer, means operative during the second and subsequent performances of said loop for causing instructions stored in said buffer to be retrieved therefrom, and means operative during the second and subsequent performance of the said loop when all instructions stored in said buffer have been performed, for causing the remaining instructions of said loop to be retrieved directly from the main computer system memory.

2. An instruction buffering system for use in a computer system including a main memory, an arithmetic unit, and an instruction unit said instruction unit including instruction register means, instruction counter means and means for accessing said main memory and loading said instruction register, said buffering system comprising:

means for indicating that a storable program loop has been encountered, a buffer memory, means for determining if each instruction of said loop is stored in said buffer memory, means operative to transfer to and store each said instruction in said buffer memory from said instruction register if not previously stored therein said room is available, and means for accessing said buffer memory for each said instruction if it has been previously stored therein.

3. An instruction buffering system as set forth in claim 2 including means for determining that a requested instruction is not in said buffer memory, means for accessing said requested instruction directly from main memory when it is determined that it is part of an instruction loop which is stored in the buffer memory but that the said requested instruction is not stored therein due to a lack of available storage locations.

4. An instruction buffering system as set forth in claim 3 wherein said determination means includes means for comparing the address of a requested instruction located in the Instruction Counter with address data stored in said buffering system as a result of storing instructions in said buffer memory.

5. An instruction buffering system as set forth in claim 4 including means for storing a plurality of individual program loops and for accessing a particular loop at its beginning point in said buffer memory.

6. An instruction buffering system as set forth in claim 5 wherein said last named means includes Origin Register means for storing the actual Instruction Counter address of the first instruction of a given loop and means for detecting such initial address in said instruction counter and for supplying same to said Origin Register means.

7. An instruction buffering system as set forth in claim 6 including counter means associated with each Origin Register means for storing an indication of the total number of instructions of a given loop that are currently stored in said buffer memory.

8. An instruction buffering system as set forth in claim 7 including means for adding selective ones of said last named counters for accessing a previously stored instruction from said buffer memory.

9. An instruction buffering system as set forth in claim 8 including means for detecting that a given instruction address appearing in said instruction counter comprises the initial address of a new program loop.

10. An instruction buffering system as set forth in claim 9 wherein said last named means includes counter means and means for selectively comparing the contents of same with said instruction counter whereby an inequality of said two counters indicates the presence of a new loop address in the instruction counter.

11. An instruction buffering system as set forth in claim 10 including means for generating addresses in said buffer memory for each new instruction to be stored therein and for indicating when all of the available storage locations therein have been filled.

12. In an electronic computer system including a main computational unit, Main Memory, Instruction Register, and Instruction Counter together with means for accessing instructions from the Main Memory to the Instruction Register under control of the Instruction Counter, the improvement which comprises an Instruction Buffering System operative in conjunction with said Instruction Register and Instruction Counter, said Instruction Buffering System including a main control unit, means for setting said unit to an active state when it is determined that a storable program loop has been detected in the Instruction Register, means for accessing a given instruction directly from Main Memory into the Instruction Register when said main control unit is in its inactive state, a buffer memory, means for storing instructions in said buffer memory, means for indicating the relative addresses of instructions stored in said buffer memory, means operative in response to the active condition of said main control unit to examine said indicating means for the presence of a particular instruction in said buffer memory, means operative in response to an affirmative determination by said examining means to cause the instruction specified by the address stored in the instruction counter to be fetched from said buffer memory and placed in said Instruction Register, means responsive to a negative determination by said examining means for causing the instruction specified by the Instruction Counter to be accessed from Main Memory and placed in the Instruction Register, means for comparing the address currently in the Instruction Counter with the address previously in the Instruction Counter, means operative in response to a negative determination by said comparison to cause a new loop storage sequence to be initiated in said buffer memory, and means for storing the instruction fetched from Main Memory in the buffer memory if the main control unit is active, if it is previously determined that the instruction is not stored in the buffer memory, and also if there is available storage room in the buffer memory for storing said instruction.

13. In a computer system as set forth in claim 12 said means for determining whether an instruction is currently stored in the buffer memory including means for storing the address of an initial instruction of a given loop as determined from the Instruction Counter, associated counter means for determining the total number of instructions in a given loop, and arithmetic means for comparing a current instruction address appearing in the Instruction Counter with the weighted sum of said register and its associated counter means.

14. In a computer system as set forth in claim 13 means for storing a plurality of program loops in said buffer wherein an initial address storage register and counter are provided for each loop susceptible of storage in said buffering system.

15. In a computer system as set forth in claim 14 said means for determining the availability of storage locations in said buffer memory comprising
   a counter which is indexed each time a new instruction is stored in said memory regardless of the program loop to which it belongs, said counter further functioning to generate storage addresses in said buffer memory and having
   means therein for providing an output signal when the counter is advanced to a point equal to the number of buffer memory storage locations.

16. In a computer system as set forth in claim 15 counter means for indicating when the loop storage capacity of said buffer memory has been reached, and
   means for incrementing said counter each time a new loop is detected in said Instruction Counter and a determination is made that said instruction has not been previously stored in the buffer memory.

References Cited

UNITED STATES PATENTS

| | | | |
|---|---|---|---|
| 3,251,041 | 5/1966 | Chu | 340—172.5 |
| 3,275,991 | 9/1966 | Schneberger | 340—172.5 |
| 3,290,656 | 12/1966 | Lindquist | 340—172.5 |
| 3,337,851 | 8/1967 | Dahm | 340—172.5 |

RAULFE B. ZACHE, Primary Examiner